Sept. 7, 1948.    J. LEMIRE    2,448,812
ELECTRIC TIMING MOTOR
Filed Sept. 30, 1946
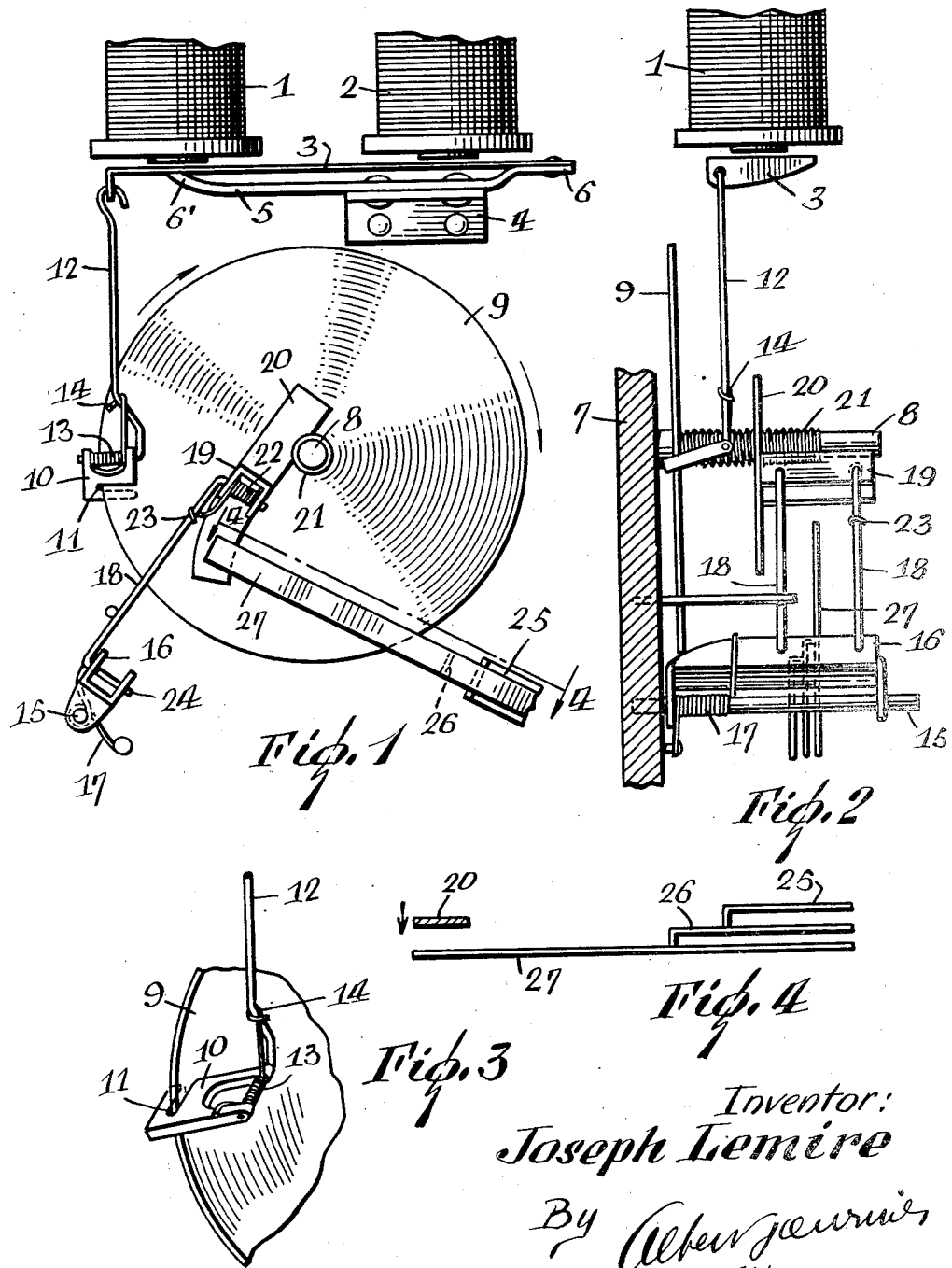
Inventor:
Joseph Lemire
By Albert Jenner
Attorney Patented Sept. 7, 1948

2,448,812

UNITED STATES PATENT OFFICE 2,448,812

ELECTRIC TIMING MOTOR

Joseph Lemire, Drummondville, Quebec, Canada, assignor of fifty per cent to Nobert Boisvert, Drummondville, Quebec, Canada Application September 30, 1946, Serial No. 700,264

2 Claims. (Cl. 172—126)

The present invention pertains to a novel electric motor for operations requiring little speed and power, such as the operation of relays, timed switches and the like. In this connection it is understood that the speed of the motor, although low, is constant.

The principal object of the invention is to provide a simple and inexpensive apparatus of the character described and one that can be relied upon for a constant rate of speed in order that the operation performed by it shall be accurately timed.

With this object in view, the invention comprises one or more electromagnets adapted to vibrate an armature. If alternating current is used, the vibration is automatic. In the case of direct current, the conventional circuit-breaking means may be employed. The latter has an inherent constant frequency, while the frequency of alternating current is known to be highly constant.

The vibrating armature is linked to a rotatably mounted disk by means of a one-way claw. The claw is so constructed as to engage the disk when the armature is attracted to the magnet and to disengage the disk when the armature recedes from the magnet. Thus, the disk is rotated in only one direction at a uniform, although low, rate of speed.

It is evident that the constant speed of the disk may be employed for various timing purposes. As an example, a threaded shaft may rotate with the disk and advance a member in engagement therewith. The latter will in turn engage and operate various parts such as elements of relays or switches, and the latter operation is accurately timed inasmuch as the travel of the member is constant and predetermined.

The invention is fully disclosed by way of example in the following description and in the accompanying drawings in which:

Figure 1 is a side elevation of an apparatus according to the invention;

Figure 2 is an elevation in a plane perpendicular to Figure 1;

Figure 3 is a perspective detail of Figure 1, and

Figure 4 is a section on the line 4—4 of Figure 1.

Reference to these views will now be made by use of like characters which are employed to designate corresponding parts throughout.

In Figure 1 is shown a pair of electromagnets 1 and 2 having a common armature 3 in the form of a spring blade. A fixed bracket 4 supports an elongated member 5 having one end secured at 6 to one end of the armature 3 and the other end bent at 6' to receive spring blade 3.

Adjacent to the magnets is a support 7 from which extends a rotatable shaft 8, and on the shaft is fixedly mounted a disk 9. The periphery of the disk is engaged by a one-way claw comprising a plate 10 having a slot 11 in which the edge of the disk is received. A wire 12 extends from the free end of the armature 3 and has one end articulated to the plate 10. A coil spring 13 is mounted in the plate 10 and has one end 14 engaged with the wire 12. An upward pull on the wire 12 causes the plate 10 to bind the disk 9 at the slot 11 and thereby rotates the disk 9 slightly in the clockwise direction in the assembly shown in Figure 1. The spring 13 is tensioned in the direction to free the claw 10 from binding engagement with the disk 9 when the armature 3 drops.

With alternating current the vibration of the armature is automatic. With direct current, the device operates in the manner of a conventional buzzer. The attraction of the magnets tensions the spring blade 5 until the current is cut when spring 3 is lifted from end 6'. When spring 6 return to end 6' the current is set and the armature is attracted again by the magnets. In either case the intermittent gripping movement of the claw 10 on the disk 9 causes a relatively slow rotation of the disk proportional to the frequency of the alternating current or the frequency of the system 3, 5 in the case of direct current.

Accordingly, the rotation of the disk 9 or the shaft 8 at a predetermined rate may be used for timing operations to actuate various kinds of switches. An example of such a system is shown in Figures 1, 2 and 4. A pin 15 extends from the support 7 and has a blade 16 pivoted thereon, tensioned by a coil spring 17. Rods 18 extend from the blade 16 and carry a U-shaped member 19. To one end of the latter is attached a strip 20 having an edge engaged with a screw thread 21 formed on a portion of the shaft 8. A wire spring 22 in the member 19 is hooked at 23 on one of the members 18 in a manner to hold the strip 20 yieldingly against the thread 21. Consequently the rotation of the shaft 8 advances the strip 20, this movement being permitted by the pivotal mounting of the rods 18 in the member 16, as indicated by the numeral 24 in Figure 1.

A switch element 25 engages another switch element 26, and the latter engages a third element 27. The latter, however, lies in the path of the member 20, as shown in Figure 4, and the several elements are tensioned successively one against the other. Eventually the member 20 engages the member 27 and separates it from the member 26, thereby opening a circuit. After a lapse of time, the element 26 separates from the element 25 and opens another circuit. These events are of course timed according to the movement of the member 20 along the threads 21, which in turn is determined by the frequency of the armature 3. To modify the speed of rotation of disk 9, the member 5 is bent to vary the course of spring 3.

Although a specific embodiment of the invention has been illustrated and described, it will be understood that various alterations in the details of construction may be made without departing from the scope of the invention as indicated by the appended claims.

What I claim as my invention is:

1. In an electric motor, an electromagnet, an armature adapted to be vibrated thereby, a disk rotatably mounted adjacent to said armature, a slotted plate engaging the periphery of said disk, with the periphery received in the slot of the plate, and a link connection extending from said armature and pivotally attached to said plate, and a spring between said plate and link connection and tensioned oppositely to the attraction direction of said armature, whereby to space the walls of said slot from said disk when said armature is released from said magnet.

2. In an electric motor, an electromagnet, an armature adapted to be vibrated thereby, a disk rotatably mounted adjacent to said armature, a one-way claw engaging the periphery of said disk, a link connection between said armature and said claw, a threaded shaft rotatable with said disk, a strip in edgewise engagement with the thread of said shaft, and means yieldingly supporting said strip in engagement with said thread.

JOSEPH LEMIRE.

REFERENCES CITED

The following references are of record in the file of this patent:

UNITED STATES PATENTS

| Number | Name | Date |
| --- | --- | --- |
| 279,634 | Bogart | June 19, 1883 |
| 603,383 | Knutson | May 3, 1898 |
| 1,157,028 | Noble | Oct. 19, 1915 |
| 1,376,531 | Greenwood | May 3, 1921 |
| 2,002,124 | Neuenschwander | May 21, 1935 |
| 2,019,093 | Rasmussen | Oct. 29, 1935 |
| 2,137,507 | Ostline | Nov. 22, 1938 |
| 2,174,086 | Hoffmann | Sept. 26, 1939 |
| 2,235,038 | Pearce et al. | Mar. 18, 1941 |

FOREIGN PATENTS

| Number | Country | Date |
| --- | --- | --- |
| 16,607 | Australia | Mar. 4, 1935 |
| 452,668 | Great Britain | Aug. 27, 1936 |